United States Patent [19]

Bull et al.

[11] Patent Number: 4,935,908
[45] Date of Patent: Jun. 19, 1990

[54] FINDING THE DIRECTION OF A SOUND

[75] Inventors: Martyn D. Bull, Amersham, England; Philip G. Harper, Edinburgh, Scotland; Stuart I. Jardine, Aberdeen, Scotland; David M. Treherne, Edinburgh, Scotland

[73] Assignee: National Research Development Corporation, London, England

[21] Appl. No.: 412,602

[22] Filed: Sep. 27, 1989

Related U.S. Application Data

[63] Continuation of Ser. No. 803,405, filed as PCT GB85/00118 on Mar. 27, 1985, published as WO85/04490 on Oct. 10, 1985, abandoned.

[30] Foreign Application Priority Data

Mar. 27, 1984 [GB] United Kingdom ............. 8407914

[51] Int. Cl.$^5$ ............................................. G01S 3/80
[52] U.S. Cl. ................................. 367/118; 367/174; 310/800
[58] Field of Search ............. 367/140, 149, 118, 174, 367/163; 310/324, 800; 381/159

[56] References Cited

U.S. PATENT DOCUMENTS

| | | |
|---|---|---|
| 3,264,604 | 8/1966 | Bartlett . |
| 3,559,162 | 1/1971 | Granfors et al. . |
| 4,064,375 | 12/1977 | Russell et al. ............... 310/800 X |
| 4,268,912 | 5/1981 | Congdon ........................ 367/163 |
| 4,401,911 | 8/1983 | Ravinet et al. ............. 310/800 X |
| 4,581,727 | 4/1986 | Harper et al. ................... 367/118 |

FOREIGN PATENT DOCUMENTS

| | | |
|---|---|---|
| 2386953 | 11/1978 | France . |
| 1260387 | 1/1969 | United Kingdom . |
| 1553251 | 9/1979 | United Kingdom ............ 367/127 |
| 2116322 | 9/1983 | United Kingdom . |

OTHER PUBLICATIONS

Mesures, Regulation, Automatisme, vol. 46, No. 11, Nov. 1981, Paris, pp. 73-85; F. Micheron: "vers une nouvelle generation de capteurs grance aux polymeres piezoelectriques", see p. 88, FIG. 1(a), 1(b) and caption.

Primary Examiner—Thomas H. Tarcza
Assistant Examiner—Tod Swann
Attorney, Agent, or Firm—Cushman, Darby & Cushman

[57] ABSTRACT

An arrangement for finding the direction of a sound in a medium has a thin shell structure having a circular symmetry. The structure can flex in response to incident sound energy from the medium to perturb the form of the structure. A membrane of a piezo-electric material with an anisotropic piezo-electric response to distortion is arranged to be distorted by the perturbation of the thin shell structure. The response of the membrane to this perturbation permits the direction of the incident sound to be indicated. The membrane can be of polyvinylidene difluoride with anisotropic properties. The membrane may be formed into a "dome" for example by fluid pressure inside a hemispherical shell closed by the membrane.

12 Claims, 1 Drawing Sheet

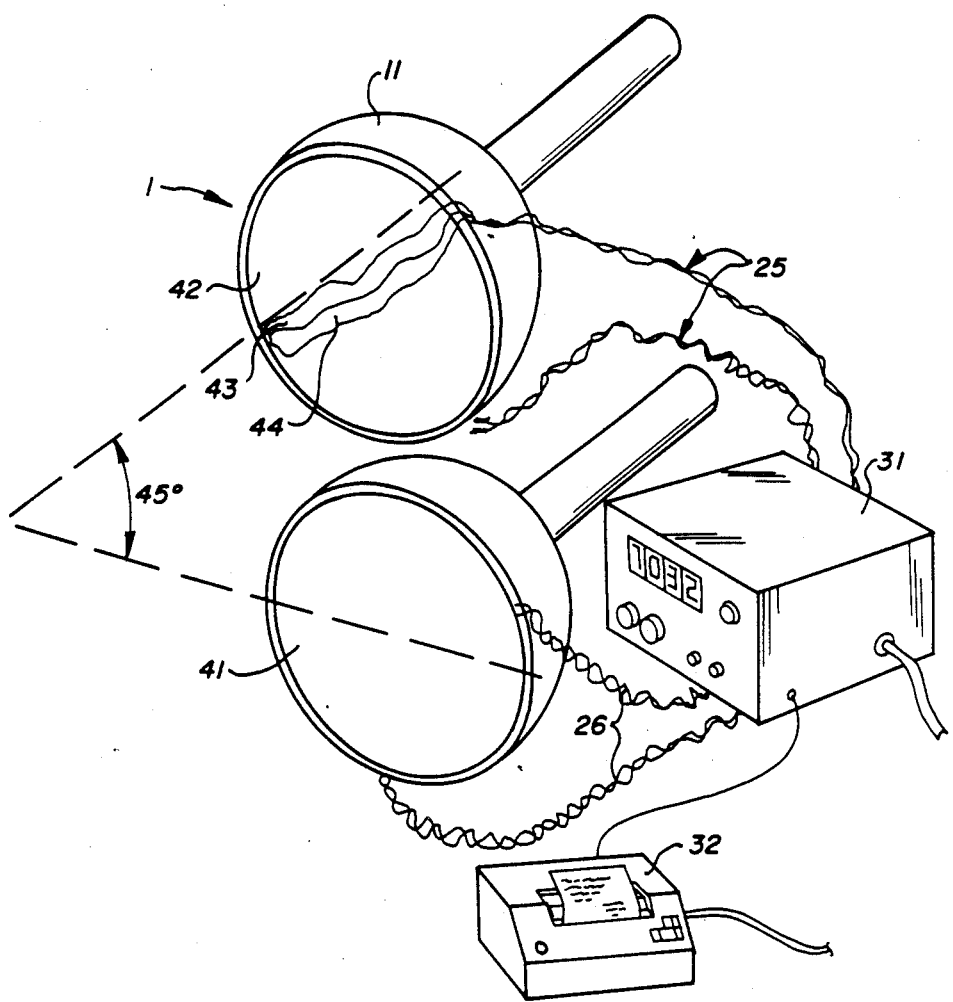

FINDING THE DIRECTION OF A SOUND

This is a continuation of application Ser. No. 06/803,405, filed as PCT GB85/00118 on Mar. 27, 1985, published as WO85/04490 on Oct. 10, 1985, now abandoned.

This invention relates to finding the direction from which a sound is coming.

UK Patent Application No. 8236240 (based on UK 8202553) published as 2116322A describes an arrangement for finding the direction of a sound in a medium including a thin shell structure of a form having a circular symmetry, the structure to flex in response to incident sound energy from the medium and perturb the form of the structure, together with means to detect the perturbation of the form of the structure, and thereby indicate the direction of the incident sound, such an arrangement is herein referred to as "of the type described".

The relevance of the perturbation to the direction of a sound, as described in the above published Application, is incorporated herein by reference.

The means to detect the perturbation of the form in the above published Application include strain gauges and other devices as well as holographic techniques for viewing the structure.

Such means are satisfactory but clearly an improvement in sensitivity of a direction finder is always being sought.

It is an object of the invention to provide an arrangement of the type described with enhanced sensitivity.

According to the invention there is provided an arrangement of the type described including a membrane of a piezo-electric material with an anisotropic piezo-electric response to distortion arranged to be distorted by the perturbation of the thin shell structure and thereby permit the indication of the direction of incident sound.

Conveniently the membrane is of polyvinylidene difluoride, also known as PVdF or $PVF_2$, with anisotropic properties. The membrane can have a conductive layer coated on each surface to provide an electrical pick-up connection of the piezo-electrically generated signal. The anisotropic properties may be produced by stretching a film of material during manufacture. The PVdF may be that produced by Kureha Corporation in Japan or the Fulmer Research Institute in UK. The thickness of the membrane can be chosen to suit a particular resonator design.

More than one sheet of anisotropic piezo-electric material may be used in a membrane. The more sensitive axes of the sheets may be at an angle, conveniently 45° although others are suitable.

More than one shell may be used, each with a membrane, and with the shells arranged to put the more sensitive axes of the sheet on each shell at an angle, conveniently 45° although others are suitable.

By the use of inclined more sensitive axes the directions of the vibrations of the shell indicating the direction of the incident sound can be determined. Embodiments of the invention will now be described with reference to the accompanying drawing wherein a preferred embodiment of the present invention is shown.

A shell 1, for example a hemisphere 11 or other shape as described in the above published Application, has attached across the open end or mouth a sheet 43 of PVdF currently produced by the Kureha Corporation which, as a consequence of the manufacturing process, has an anisotropic piezo-electric response, in mutually perpendicular directions. The material is about 9 microns thick for an 80 mm shell although the thickness used can be altered. The sheet is coated on each surface with a conductive layer 42, 44 to pick up piezo-electrically generated voltage signals. The sheet is attached to the shell by adhesive or other suitable means, epoxy resin such as ARALDITE (R.T.M.) is convenient. The sheet is attached in a known orientation of the more sensitive axis of anisotropy to be stretched or otherwise distorted by the vibration of the shell, when this is perturbed in response to incident sound as described in the above published Application.

The performance of the membrane is improved if it is arranged to be in slight tension, so that perturbation of the shell does not permit the membrane to relax completely. The membrane may be caused to curve or "dome" by an excess of reduced pressure on one side compared to the other. Conveniently, the fluid pressure inside the shell exceeds the ambient pressure to produce the "doming" 44.

The anisotropic nature of the material of the membrane enables the position of the perturbations around the shell to be determined.

By using two pieces of material arranged with their axes of anisotropy inclined at a known angle it is possible to determine the direction of an incident sound by distinguishing a change in direction from a change in distance of a sound.

The angle of 45° between the axes of maximum sensitivity is convenient but other angles are possible and may be useful in specific case.

The two pieces can be on separate shells or the same shell. When on the same shell the membrane is then a laminate or sandwich construction of PVdF and conductive layers. More than two sheets of PVdF may be used in a membrane.

When two shells are used they should both respond to the same frequency. The frequency is not necessarily the frequency of an acoustic source being listened to or listened for. The source may be one operated in conjuction with the arrangement or a source which is not controlled to so operate. Also the source may be pulsed at another frequency. The response of the shell at its particular frequency produces one output from the membrane, a narrow-band, directional response. In addition the PVdF film itself acts as a detector of sound over a range of frequencies, a broad-band, non-directional response. Signals from both responses can be examined simultaneously or in turn using appropriate signal processing methods 31, 32.

The signals from the conductive layers can be carried by one or more conductors 25, 26 respectively, several conductors providing protection against breakage of one.

The material used, that provided by Kureha Corporation, is available in various thicknesses from about 9 microns to 40 microns. The thickness of the material is chosen with regard to the required performance. The thicker the material in the membrane the greater the damping of the response and the reduction of resonant frequency and Q of the arrangement. The thicker membrane is probably more suitable for use in air with thinner membranes probably better for use in liquids.

The pressure inside a shell may be altered from the ambient to "tune" the arrangement. The pressure may be slightly above ambient to pretension or "dome" the membrane to optimise the response.

The arrangement of the shell with a membrane having an anisotropic response improves the sensitivity and utility of the arrangement compared with that having an attached strain gauge. The arrangement may be used as described for the shell and strain gauge arrangement in the above published Application.

We claim.

1. An apparatus for determining the direction of a sound in a medium comprising:
    a thin shell structure of a form having a substantially circular symmetry and having a closed end and an open end, said thin shell structure being adapted to flex in response to incident sound energy from the medium so as to perturb the form of the structure, and
    a membrane of a piezo-electric material with an anisotropic piezo-electric response to distortion being mounted to said thin shell structure so as to be disposed in the plane of and across at least a portion of an opening defined by said open end so as to be distorted by the perturbation of the thin shell structure and thereby permit the indication of the direction of incident sound.

2. An apparatus according to claim 1 in which the membrane is of polyvinylidene difluoride, also known as PVdF or $PVF_2$, with anisotropic properties.

3. An apparatus according to claim 1 in which the membrane has a conductive layer coated on each surface to provide an electrical pick-up connection of the piezo-electrically generated signal.

4. An apparatus according to claim 2 in which said anisotropic properties are those produced by stretching a film of material during manufacture.

5. An apparatus according to claim 1 in which the membrane is of more than one sheet of anisotropic piezo-electrical material.

6. An apparatus according to claim 5 in which the more sensitive axes of the sheets are at an angle.

7. An apparatus according to claim 6 in which said angle is 45°.

8. An apparatus according to claim 1 including more than one said thin shell structure, each said thin shell structure having a membrane formed from a sheet of anisotropic piezo-electric material.

9. An apparatus according to claim 8 in which the shells are arranged to put the more sensitive axes of the sheet one each shell at an angle.

10. An apparatus according to claim 9 in which the angle is 45°.

11. An apparatus according to claim 1 in which the membrane is caused to form a dome.

12. An apparatus according to claim 1 in which there is a pressure difference across the membrane.

* * * * *